United States Patent
Rechsiek et al.

(10) Patent No.: US 9,108,724 B2
(45) Date of Patent: Aug. 18, 2015

(54) ADJUSTMENT SYSTEM OF AN AEROPLANE WITH AN ADJUSTABLE FLAP

(71) Applicant: Airbus Operations GmbH, Hamburg (DE)

(72) Inventors: Martin Rechsiek, Hamburg (DE); Wilfried Ellmers, Achim (DE); Christoph Winkelmann, Buchholz (DE)

(73) Assignee: Airbus Operations GmbH, Hamburg (DE)

( * ) Notice: Subject to any disclaimer, the term of this patent is extended or adjusted under 35 U.S.C. 154(b) by 118 days.

(21) Appl. No.: 13/724,319

(22) Filed: Dec. 21, 2012

(65) Prior Publication Data

US 2013/0181089 A1    Jul. 18, 2013

Related U.S. Application Data

(63) Continuation of application No. PCT/EP2011/003203, filed on Jun. 29, 2011.

(60) Provisional application No. 61/359,436, filed on Jun. 29, 2010.

(30) Foreign Application Priority Data

Jun. 29, 2010    (DE) .......................... 10 2010 025 475

(51) Int. Cl.
*B64C 13/28*    (2006.01)
*B64C 9/16*    (2006.01)
*B64D 45/00*    (2006.01)

(52) U.S. Cl.
CPC . *B64C 13/28* (2013.01); *B64C 9/16* (2013.01); *B64D 45/0005* (2013.01); *B64D 2045/001* (2013.01); *Y02T 50/44* (2013.01)

(58) Field of Classification Search
CPC ...... B64C 13/28; B64C 9/16; B64D 45/0005; B64D 2045/001
USPC .................................... 244/99.3; 73/862.631
See application file for complete search history.

(56) References Cited

U.S. PATENT DOCUMENTS 3,695,096 A * 10/1972 Kutsay ............................ 73/761
4,576,053 A *  3/1986 Hatamura ................ 73/862.629
(Continued)

FOREIGN PATENT DOCUMENTS

DE         33 08 301 B3    9/1984
DE        103 08 301 B3    7/2004
(Continued)

OTHER PUBLICATIONS

International Search Report for Application No. PCT/EP2011/003203 dated Dec. 13, 2011.
(Continued)

*Primary Examiner* — Brian M O'Hara
*Assistant Examiner* — Michael Kreiner
(74) *Attorney, Agent, or Firm* — Jenkins, Wilson, Taylor & Hunt, P.A.

(57) ABSTRACT

An adjustment system of an aeroplane, having: at least one adjustable flap on each of the wing of an aeroplane, adjustable with an adjustment device, a drive device for purposes of driving the adjustment devices, and a load sensor for purposes of recording the load occurring in the load path between the actuator and the adjustable flap of the respective adjustment device. The load sensor is embodied as a sensor for purposes of measuring the longitudinal force occurring in a drive rod along its longitudinal direction.

12 Claims, 5 Drawing Sheets

(56) References Cited

U.S. PATENT DOCUMENTS

| | | | |
|---|---|---|---|
| 4,858,475 A * | 8/1989 | Jacobson et al. | 73/862.631 |
| 5,719,566 A | 2/1998 | Readman et al. | |
| 5,740,991 A * | 4/1998 | Gleine et al. | 244/203 |
| 6,311,566 B1 * | 11/2001 | Ferguson | 73/802 |
| 6,776,376 B2 * | 8/2004 | Collins | 244/213 |
| 6,830,223 B1 * | 12/2004 | Moore | 244/220 |
| 6,957,584 B2 * | 10/2005 | Jackson | 73/765 |
| 7,048,234 B2 * | 5/2006 | Recksiek et al. | 244/213 |
| 7,195,209 B2 * | 3/2007 | Schievelbusch | 244/215 |
| 7,296,487 B2 * | 11/2007 | Mayer et al. | 73/862.541 |
| 7,299,702 B2 | 11/2007 | Gibert | |
| 7,430,927 B2 * | 10/2008 | Mayer et al. | 73/862.541 |
| 7,945,425 B2 * | 5/2011 | Marx et al. | 702/183 |
| 8,024,980 B2 * | 9/2011 | Arms et al. | 73/763 |
| 8,033,500 B1 * | 10/2011 | Charafeddine et al. | 244/75.1 |
| 8,074,937 B2 * | 12/2011 | Carl et al. | 244/194 |
| 8,157,208 B2 * | 4/2012 | Recksiek et al. | 244/99.3 |
| 8,191,824 B2 * | 6/2012 | Shaheen et al. | 244/76 A |
| 8,224,502 B2 * | 7/2012 | Brueckner et al. | 701/3 |
| 8,245,967 B2 * | 8/2012 | Kirkland | 244/76 R |
| 8,418,955 B2 * | 4/2013 | Recksiek et al. | 244/99.5 |
| 8,746,625 B2 * | 6/2014 | Recksiek et al. | 244/215 |
| 8,814,085 B2 * | 8/2014 | Richter et al. | 244/99.4 |
| 2004/0251382 A1 | 12/2004 | Schievelbusch | |
| 2005/0178215 A1 | 8/2005 | Mayer et al. | |
| 2010/0100355 A1 | 4/2010 | Marx et al. | |
| 2011/0001015 A1 * | 1/2011 | Kracke | 244/213 |
| 2011/0108671 A1 * | 5/2011 | Soronda | 244/195 |
| 2011/0255968 A1 | 10/2011 | Recksiek | |
| 2012/0091282 A1 * | 4/2012 | Spiller | 244/213 |
| 2013/0261852 A1 * | 10/2013 | Recksiek et al. | 701/3 |
| 2013/0327887 A1 * | 12/2013 | Dyckrup et al. | 244/99.9 |

FOREIGN PATENT DOCUMENTS

| | | |
|---|---|---|
| DE | 10 2008 052754 | 5/2010 |
| DE | 10 2009 053 126 | 5/2011 |
| DE | 10 2010 025 475 | 12/2011 |
| EP | 2 067 697 A1 | 6/2009 |
| WO | WO 2012/000664 | 1/2012 |

OTHER PUBLICATIONS

German Office Action for Application No. 10 2010 025 475.4 dated Mar. 12, 2014.

* cited by examiner

ADJUSTMENT SYSTEM OF AN AEROPLANE WITH AN ADJUSTABLE FLAP

CROSS-REFERENCE TO RELATED APPLICATIONS

This application is a continuation of and claims priority to PCT/EP2011/003203 filed Jun. 29, 2011, which claims the benefit of and priority to U.S. Provisional Application No. 61/359,436, filed Jun. 29, 2010 and German Patent Application No. 10 2010 025 475.4 filed Jun. 29, 2010, the entire disclosures of which are herein incorporated by reference.

TECHNICAL FIELD

The invention concerns an adjustment system of an aeroplane. The adjustment system has at least one movable adjustable flap on each wing, wherein the adjustable flap in general is an adjustable aerodynamic flap of an aeroplane and in particular can be a high-lift flap. The adjustment system can in particular be a high-lift system of an aeroplane.

BACKGROUND

From the general prior art landing flap systems with a central drive and a central torsion shaft train are known art, by means of which the adjustment devices for purposes of adjusting a flap are actuated. The shaft train transfers the mechanical drive power from a central drive motor to the actuators that move the flaps. In the event of e.g. jamming of the adjustment devices any further transference of drive power onto the adjustable flap must be prevented. For the detection of such an event the use of a load sensor is of known art.

In U.S. Pat. No. 7,195,209 a load sensor for the drives of high-lift systems is disclosed, with which the load at the output of an actuator is measured, any overload is detected, and accordingly the drive system is rendered passive.

U.S. Pat. No. 7,195,209 discloses a high-lift system with a drive system, elements to transfer the drive energy over the whole width of the span to drive stations of individual segments of landing flap systems/leading-edge slat systems and with overload protection provided by electrical load sensors, which are arranged at the points at which the drive power from the respective gearbox is introduced into the flap body, in other words at the points at which the drive power is transferred from the output lever of the gearbox.

SUMMARY

The object of the invention is to provide an adjustment system of an aeroplane with a adjustable flap, and a load sensor for purposes of determining a load in an adjustment device of a adjustable flap, with which a more reliable and more accurate determination of the load values as possible, and with which integration of the load sensor is as convenient as possible in terms of maintenance time and cost.

A further object of the invention is to provide an adjustment system of an aeroplane with a adjustable flap and a load sensor for purposes of determining a load in an adjustment device of a adjustable flap, with which, in particular also during any replacement of parts, in particular of the actuator of the adjustment system and its accommodation to the structural circumstances in the adjustment system, the accuracy of the load sensor is not impaired.

In accordance with the invention an adjustment system or actuation system is provided, having:

at least one adjustable flap on each of the wings of an aeroplane, supported on the wing via at least two bearing assemblies, and movable relative to the wing, at least one adjustment device for purposes of adjusting the adjustable flap, wherein each adjustment device has: an actuator and a kinematic adjustment mechanism for the kinematic coupling of the actuator to the adjustable flap with a drive rod, which couples the actuator with the adjustable flap via a first and a second articulation, at least one drive device for purposes of driving the adjustment devices, a load sensor for purposes of capturing the load occurring in the load path between the actuator and the adjustable flap of the respective adjustment device e.g. as a result of external forces acting on the adjustable flap, a control and monitoring device, functionally connected with the at least one drive device, for purposes of adjusting the adjustment devices, which control and monitoring device is functionally connected with the at least one load sensor for purposes of receiving sensor signals generated by the load sensors, and has a load monitoring function for the drive train between the adjustable flap and the drive device on the basis of the sensor signals.

In particular the at least two adjustment devices assigned to one flap can be spaced apart from one another in the spanwise direction of the flap. Furthermore, the control and monitoring device can be arranged in a central aeroplane component, in particular in the fuselage, or can be decentralised and thereby in particular arranged such that provision is made that a control and monitoring device is respectively assigned to the adjustment devices of each adjustable flap. Furthermore, a higher-level control and monitoring device can be arranged to be functionally at a higher level than these decentralised control and monitoring devices; the higher-level control and monitoring device monitors the decentralised control and monitoring devices.

In accordance with one form of embodiment of the invention the load sensor is a sensor for purposes of measuring the longitudinal force occurring in a drive rod along its longitudinal direction, which longitudinal force occurs in the load path between the actuator and the adjustable flap of the respective adjustment device. In particular a parameter analogous to this longitudinal force is thereby registered, such as e.g. an extension or deformation of the drive rod.

In one example of embodiment of the adjustment system in accordance with the invention provision is made that the load sensor is formed from at least one strain gauge, which is fitted to the drive rod. Here the at least one strain gauge can be arranged on the outer surface of the drive rod. Alternatively or additionally the drive rod can, at least in some sections, be designed as a hollow body with the formation of an internal cavity, and the at least one strain gauge can be arranged on the inner surface of the internal cavity of the drive rod. With these forms of embodiment the at least one strain gauge can be fitted to the drive rod such that it can be removed.

In accordance with one form of embodiment of the invention the drive rod is formed from a first drive rod section, articulated on the actuator lever, a second drive rod section, articulated on the adjustable flap, which in the longitudinal direction of the drive rod is arranged behind the first drive rod section, and a sensor, which registers the force occurring between the first and second drive rod sections, or a relative movement between the first and second drive rod sections, or a parameter analogous to the latter, for purposes of determining the longitudinal force that occurs in the load path between the actuator and the adjustable flap of the respective adjustment device.

In accordance with one form of embodiment of the invention provision is made that the drive rod is formed from a first drive rod section, articulated on the actuator lever, a second drive rod section, articulated on the adjustable flap, and a transverse pin coupling these, wherein the drive rod sections are arranged partially overlapping one another with the formation of an overlap region, and the transverse pin for purposes of producing a force-transferring coupling of the drive rod sections passes through the latter in their overlap region transverse to the longitudinal direction of the drive rod. Here the load sensor is a sensor arranged on the transverse pin for purposes of determining the transverse forces acting on the pin, which result from the longitudinal forces occurring in the drive rod.

The two drive rod sections can be embodied in the form of tubes that are guided relative to one another.

Here in particular provision can be made that the load sensor is embodied as a strain gauge such that the it measures an extension on the surface of a transverse pin or a housing accommodating the latter, which extension ensues as a result of the force exerted by the adjustable flap onto the connecting pin. The strain gauge can thereby be fitted on a surface of the outer surface or inner surface of the transverse pin or the housing of the articulation such that it covers a part of the periphery with reference to the central axis of the transverse pin, and in particular covers that region in which it is anticipated that the highest stresses will occur in the settings of the adjustable flap within the specified range of adjustment.

In accordance with one example of embodiment of the invention the load sensor is formed from at least one strain measurement device that is arranged on a surface of the transverse pin. Here the connecting pin can be embodied as a hollow pin and the strain measurement device can be arranged on the surface of the inner bore, in other words, on the inner surface of the transverse pin. The strain measurement device can be formed from one or a plurality of strain gauges, which can e.g. be arranged in a full bridge arrangement. In general the load sensor can be embodied as a temperature-compensated arrangement of sensor components. Alternatively the load sensor can be formed from a load cell.

The solution in accordance with the invention is particularly advantageous in the case of an adjustment system in which the drive rod is adjustable in its length, in order to be able to adjust the kinematic adjustment mechanism with reference to specified settings of the adjustable flap, e.g. the retracted position of the adjustable flap. Here provision can in particular be made that the length of the drive rod can be adjusted via a thread.

In accordance with a further form of embodiment of the invention provision is made that the drive rod is formed from a first drive rod section, articulated on the actuator lever, a second drive rod section, articulated on the adjustable flap, and a coupling device coupling these. Here the coupling device can be embodied such that it permits a relative movement between the first and the second drive rod sections.

The coupling device has a load sensor for purposes of determining longitudinal forces occurring in the drive rod. The coupling device produces a force-transferring coupling of the drive rod sections, and can in particular have a pretensioning device, and/or a damper device, with which the load sensor is integrated for purposes of determining longitudinal forces. Here the load sensor can in particular be formed from a load cell.

The arrangement of the load sensor in accordance with the invention allows a detection of fault cases that are critical for the adjustment system with the reliability that is required for a safety critical system, for which purpose threshold values must be defined for the load sensor that are sufficiently accurate in this respect.

In accordance with a further example of embodiment of the invention provision is made that the load sensor of at least one actuation device is connected via a signal connecting cable with a control and monitoring device assigned to the actuation device for purposes of transmitting the sensor signals generated by the load sensor, which cable runs from the load sensor into the adjustable flap, and from there along one of the bearing assemblies into the main wing surface and to the control and monitoring device. While this measure can indeed lead to greater cable lengths compared with the prior art, a cable routing can in this manner be diverted over or through the actuator, and in this manner the cable routing can be executed such that it is both easier to maintain and also more reliable. Furthermore, by means of this cable routing better protection of the cable can be achieved against atmospheric effects.

The adjustment system in accordance with the invention can be executed such that the control and monitoring device has a fault detection function, which is executed such that it assigns a fault state to an adjustment device with a load sensor, if on the basis of the sensor signals received from the load sensor it determines the lack of attainment of a set point value indicating an operational load.

In the design of the system in accordance with the invention the following safety critical faults, amongst others, can be detected by the adjustment system using appropriate functions of the control and monitoring device in accordance with the invention in an advantageous manner, i.e. reliably, efficiently and without the necessity of structural reinforcement measures:

- a jamming event in one of the adjustment devices, or on the flap, or in the bearing assembly of the same, wherein such a jamming event can lead to an overload and consequently to a fracture of the drive train or adjacent structural components, since in the jamming event the whole drive torque is applied at the affected station;
- a fracture of a force-transferring part of the adjustment device such as e.g. a drive lever, where the fracture of a drive lever can lead to a skewing of a flap that is guided on two guide tracks;
- a locking up of one actuation device of a adjustable flap with a drive that continues to function onto the other actuation device of the same flap, in particular as a result of a special fault internal to the actuator.

A faulty kinematic actuation mechanism or station locks up or has a very large drag torque, while the drive torque of the drive device, and e.g. of the central drive shaft continues to driven through onto the other stations. As a result the flap is moved further by the actuator on the other station. This fault leads to skewing or rotation of the flap, and in the end result can cause the flap to be torn off. In accordance with the invention a load sensor is provided for purposes of determining loads occurring in the adjustment device. This is with the application of a threshold value, the transgression of which, or the lack of attainment of which, is used to detect a fault in the kinematic actuation mechanism.

The reliability of the detection of the above-cited fault cases, and in particular of the fault case cited twice above, increases with the accuracy of a load sensor on the output drive side of the actuator, so that the load sensor provided in the drive lever in accordance with the invention, with which a relatively high measurement accuracy can be achieved, is particularly advantageous in this respect.

Furthermore, it is to be noted that when using a threshold value for the load value measured by the respective load sensor for the detection of a fault on the respective actuation device, this threshold value, by virtue of production tolerances in the kinematic adjustment mechanism and temperature effects, must when necessary take into account a scatter band of sensor values determined by the load sensor in question with reference to the loads actually occurring in each case.

By utilising the load measurement in accordance with the invention for the detection of an overload and/or underload, the mechanical load limiter can in particular be dispensed with, with a corresponding reduction of component weight. Furthermore, the detection of an overload by means of load sensors is more accurate, since mechanical load limiters have high production tolerances. As a result of the greater accuracy in the establishment of an overload, some structural components can be designed for a smaller load. By means of this "snowball effect" the structural weight is reduced.

By means of the adjustment system in accordance with the invention detection of skewing is possible through the establishment of the underlying fault by means of load measurement. This load measurement can be used for the detection of other faults, so that a variety of faults can be detected with one monitoring mechanism. Thus the total sensor required outlay for the detection of the various faults is reduced, and therefore the system reliability is increased.

In accordance with one form of embodiment of the invention the control and monitoring device is embodied such that on the basis of the sensor signals received from the load sensor it determines the lack of attainment of a set point value or threshold value indicating an operational load so as to establish a fault state on the flap. Here the control and monitoring device is embodied such that on the basis of the sensor signals received from the load sensor it determines the lack of attainment of a set point value indicating an operational load. The set point value or threshold value can also be defined as a function of the flap setting and/or the flight conditions and/or the mode of operation in which the aeroplane is being flown, and/or the aeroplane configuration (e.g. undercarriage extended or retracted).

Here in particular provision can be made that the set point value indicating an operational load is less than 60% of the measured value of the load sensor for the maximum permissible operational load, or a load determined as a maximum operational load.

In accordance with one example of embodiment of the adjustment system in accordance with the invention the set point value indicating an operational load is specified as a fixed value in the control and monitoring device.

Alternatively provision can be made that the control and monitoring device has a function that determines the set point value, with which the set point value indicating an operational load is determined under operational conditions by the control and monitoring device on the basis of operational parameters of the aeroplane. Here provision can in particular be made that the set point value indicating an operational load is determined in the control and monitoring device on the basis of a correlation of set point values specified as a function of the setting of the respectively assigned adjustable flap with the registered setting of the respectively assigned adjustable flap.

Additionally or alternatively provision can be made that the set point value indicating an operational load is a set point value determined from state parameters of the aeroplane.

In accordance with the invention provision can be made that the sensor value determined by the load sensor on the basis of a load, which is to be compared with the set point value indicating an operational load, is a value which is determined in an extended state of the respectively assigned adjustable flap.

The bearing assembly of the at least one adjustable flap has a "dropped-hinge kinematic mechanism" or a "Fowler kinematic mechanism".

The adjustment system in accordance with the invention can be embodied with a "central drive", wherein the fault-tolerant adjustment system has a drive unit that is controlled by the control and monitoring device and which is mechanically coupled via a rotary shaft with the adjustment devices of each wing for their actuation.

Here the drive device can have at least one drive motor and at least one braking device, which is assigned to the drive motor for purposes of arresting the output of the respective drive motor, wherein the control and monitoring unit has:
  an actuation function for the generation of command signals for the drive motors for purposes of adjusting the adjustable flap,
  a monitoring function, with which a command signal is sent to the braking device for purposes of actuating the same if the control and monitoring device, on the basis of the comparison of a sensor value of the load sensor with a design value for one of the adjustment devices respectively assigned to the adjustable flap, assigns a fault state.

Alternatively the adjustment system in accordance with the invention can be embodied with a "central drive", wherein
  on the at least one flap of each wing at least two adjustment devices are respectively connected, and are arranged spaced apart from one another in the spanwise direction of the flap, wherein the adjustment devices are respectively coupled via a drive train to the drive device respectively assigned to the adjustable flap, and
  the fault-tolerant adjustment system has drive devices for purposes of driving the adjustment devices, of which one drive device is respectively assigned to each adjustable flap, and which drive devices are functionally connected with the control and monitoring device that controls them.

Here provision can furthermore be made:
  that the adjustment devices of a adjustable flap have: at least one drive motor and at least one braking device, which is assigned to the drive motor for purposes of arresting the output of the respective drive motor,
  that the control and monitoring device has control and monitoring units, of which one is functionally connected in each case with the at least two adjustment devices connected in each case to a adjustable flap, wherein each control and monitoring unit has:
    an actuation function for the generation of command signals for the drive motors for purposes of adjusting the adjustable flap,
    a monitoring function, with which a command signal is sent to the braking device for purposes of actuating the same if the control and monitoring device, on the basis of the comparison of a sensor value of the load sensor with a design value for one of the adjustment devices respectively assigned to the adjustable flap, assigns a fault state.

In accordance with the invention a method is also provided for the reconfiguration of an adjustment system with adjustable adjustable flaps, which has the following steps:
  determination of signal values from a load sensor, assignment of a fault state to the adjustment device, if the load sensor determines a load that fails to attain a design load.

Here can furthermore in particular be provided:
transmission of a design command to the assigned adjustment devices, which corresponds to the position setting of the adjustment device that has been determined by the position sensor as the actual position.

BRIEF DESCRIPTION OF THE DRAWINGS

In what follows the invention is described with the aid of the accompanying figures, where.

DETAILED DESCRIPTION

In an exemplary embodiment of the invention, apparatus and methods described hereinabove are employed to improve failure recognition and/or failure identification and/or reconfiguration of an adjustment system in the case of a failure. The present invention has been described using detailed descriptions of embodiments thereof that are provided by way of example and are not intended to necessarily limit the scope of the invention. In particular, numerical values may be higher or lower than ranges of numbers set forth above and still be within the scope of the invention. The described embodiments comprise different features, not all of which are required in all embodiments of the invention. Some embodiments of the invention utilize only some of the features or possible combinations of the features. Alternatively or additionally, portions of the invention described/depicted as a single unit may reside in two or more separate physical entities which act in concert to perform the described/depicted function. Alternatively or additionally, portions of the invention described/depicted as two or more separate physical entities may be integrated into a single physical entity to perform the described/depicted function. Variations of embodiments of the present invention that are described and embodiments of the present invention comprising different combinations of features noted in the described embodiments can be combined in all possible combinations including, but not limited to use of features described in the context of one embodiment in the context of any other embodiment. Specifically, features described in the context of a method can be used to characterize an apparatus and features described in the context of an apparatus can be used to characterize a method. The scope of the invention is limited only by the following claims. In the description and claims of the present application, each of the verbs "comprise", "include" and "have" as well as any conjugates thereof, are used to indicate that the object or objects of the verb are not necessarily a complete listing of members, components, elements or parts of the subject or subjects of the verb. All publications and/or patents and/or product descriptions cited in this document are fully incorporated herein by reference to the same extent as if each had been individually incorporated herein by reference.

Figure 1:
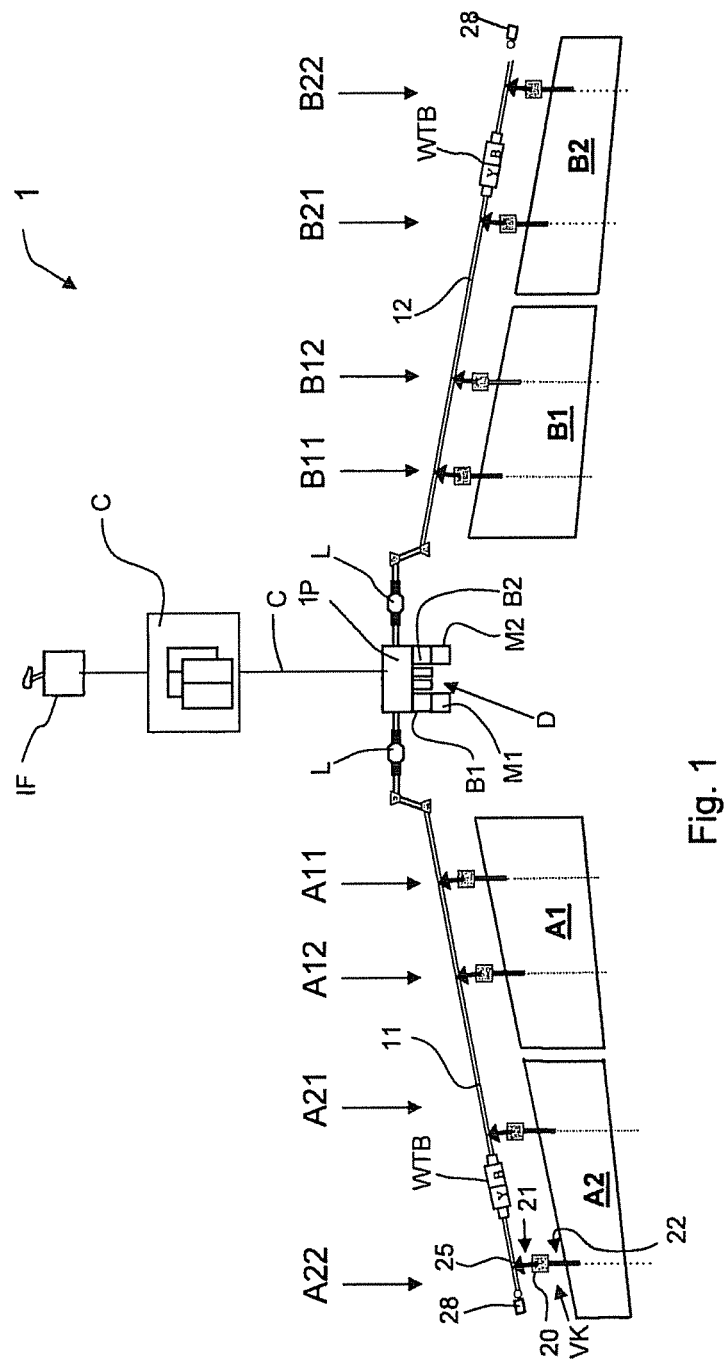
FIG. 1 shows a schematic representation of one form of embodiment of the high-lift system in accordance with the invention with adjustable flaps, of which two are provided for each wing, with adjustment devices for purposes of actuating the adjustable flaps, wherein the adjustment devices have in each case at least one actuator, and in each case at least one first load sensor, located on the input side, and a second load sensor, located on the output side of the at least one actuator, and wherein the adjustment devices are driven by a central drive motor and a rotary shaft coupled with the latter.

FIG. 1 shows one form of embodiment of the adjustment system in accordance with the invention in the form of a high-lift system 1 for purposes of adjusting at least one adjustable flap, and in particular, at least one landing flap, on each wing. In FIG. 1 two landing flaps are represented on each wing, which is not shown in the representation of FIG. 1. In detail the following are represented: an inner landing flap A1 and an outer landing flap A2 on a first wing, and an inner landing flap B1 and an outer landing flap B2 on a second wing. In the high-lift system in accordance with the invention one or more than two landing flaps can also be provided on each wing.

Figure 3:
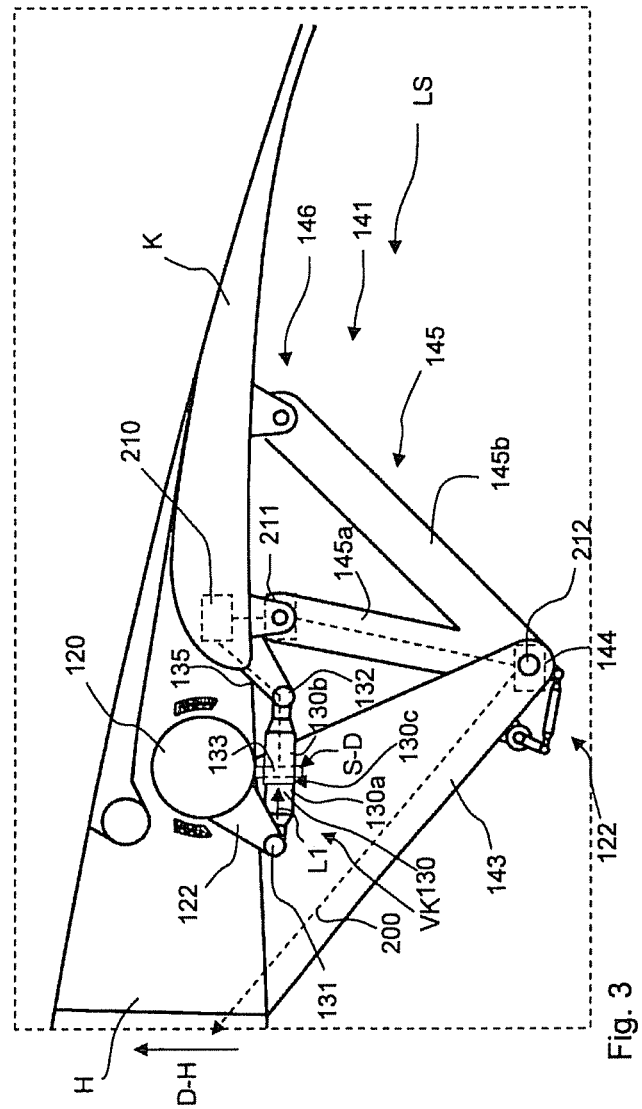
FIG. 3 shows a schematic representation of one form of embodiment of the adjustment device in accordance with the invention, with a representation of the arrangement of the load sensor in the rotary articulation, which couples the push rod with the adjustable flap.

The adjustable flaps are in each case supported such that they can move by means of a bearing station LS on the main wing surface of the wing; an example of embodiment of a bearing station is represented in FIG. 3. Furthermore each adjustable flap is coupled to an adjustment station with at least one adjustment device, wherein the adjustment station is embodied such that it can accommodate power transferred from the drive device to the adjustment station, and can convert it into an adjustment movement of the flap supported on the bearing station. In this context the term "adjustment station" is understood to mean the adjustment devices in each case connected to one adjustable flap. In the case of at least two adjustment devices, which are respectively assigned to one flap, these are arranged spaced apart from one another in the spanwise direction of the flap.

The bearing station LS can be formed from one or a plurality of bearing assemblies, which in total support the adjustable flap over the whole range of adjustment on the main wing surface. The at least one bearing assembly assigned to a flap can in general have a "dropped hinge kinematic mechanism" or a "Fowler kinematic mechanism". The "Fowler kinematic mechanism" can be designed e.g. as a "kinematic track mechanism", as a "kinematic track-link mechanism" or as a "kinematic linkage mechanism". A "kinematic track mechanism" is formed from a combination of a track and a slider that can move on the track. For purposes of adjusting the adjustable flap an adjustment device is coupled to the slider, so that the adjustment device, by virtue of the actuation by the respectively assigned drive device moves the slider on the track, and thus the flap correspondingly. Here the adjustment device can be formed from a rotary actuator or a spindle drive, which is coupled to the slider in order to move the latter. In the case of a so-called "dropped-hinge kinematic mechanism" the bearing assembly is formed from an articulated support, which is fitted on the main wing surface in the region of its trailing edge and projects downwards from there. At the outer end of the articulated support the flap is articulated by means of a mounting fitted to the main wing surface. Here the adjustment device can in particular be coupled to the flap and can be formed from a rotary actuator.

The high-lift system 1 is actuated and monitored via an interface, which in particular has a pilot interface IF and thereby a means of actuation, such as e.g. an actuation lever. The means of actuation IF is functionally coupled with a control and monitoring device C, which transmits control commands via a control cable C1 for purposes of controlling a drive device P. In the form of embodiment shown in FIG. 1 the control and monitoring device C is designed as a so-called "central" control and monitoring device C, i.e. this has control and monitoring functions for a plurality, and in particular for all, adjustment devices A11, A12, B11, B12, A21, A22, B21, B22 of the high-lift system 1.

The centrally, e.g. in the fuselage region, arranged drive device P, can be formed with one or a plurality of drive motors. In the represented form of embodiment of the high-lift system 1, the drive device P has two drive motors M1, M2, which can e.g. be implemented in terms of an hydraulic motor and an electric drive. Furthermore, the drive device P can have at least one braking device assigned to the drive motors M1, M2, which braking device can be actuated by means of a command signal from the control and monitoring device C. In the form of embodiment of the high-lift system 1 represented in FIG. 1, the drive device P has two braking devices B1, B2, each of which can be actuated by means of a command signal from the control and monitoring device C. The at least one braking device B1, B2 is functionally connected with the control and monitoring device C, which under predetermined conditions can actuate the braking device and thus can arrest the rotary shaft drive trains 11, 12. In the event of a fault in the drive motor, or in one of a plurality of drive motors, this can be shut down by means of the central drive device P or a drive motor controller assigned to the at least one drive motor. If the drive device P is formed from only one motor, the drive device can furthermore, also be embodied with only one braking device. Such a motor can in particular also be embodied as a motor incorporating redundancy, whose drive function is designed in a redundant manner for purposes of increasing the reliability.

The drive device P in the embodiment with two motors M1, M2 in accordance with FIG. 1 can have a differential D, which is coupled with the output sides of the hydraulic motor M1 and the electric motor M2 such that the power outputs provided in each case by the hydraulic motor M1 and the electric motor M2 are summated and transferred to rotary drive shaft trains, in particular in the form of rotary drive shafts 11, 12. In the form of embodiment of the high-lift system 1 in accordance with the invention represented in FIG. 1, two braking devices B1, B2, are furthermore provided, which are functionally connected with the control and monitoring device C. The control and monitoring device C is embodied such that this, under predetermined conditions, and in particular upon the assignment of a critical fault state on one of the components of the adjustment system, can actuate the braking devices B1, B2 and thus can arrest the rotary shaft drives 11, 12. If one of the two drive motors, in the example of embodiment represented e.g. the hydraulic motor M1 or the electric drive M2, is shut down, the central drive device P, by virtue of the differential, which is configured such that the power outputs provided in each case by the hydraulic motor M1 and the electric motor M2 are summated, outputs a power output reduced by the contribution of the drive motor that has been shut down. Instead of two braking devices B1, B2, it is also possible for only one braking device to be provided, and instead of two motors M1, M2, only one motor.

In the example of embodiment of the adjustment system represented the drive device P for the drive, i.e. the adjustment, of all adjustable flaps A1, A2, B1, B2, belonging to the adjustment system, that is to say, at least one adjustable flap per wing, preferably however a plurality of adjustable flaps A1, A2 or B1, B2 per wing, can be provided by means of corresponding adjustment devices. Such a drive device can in particular be arranged at a central location, i.e., in particular in the fuselage of the aeroplane. To the drive device P are coupled a total of two drive trains, in particular in the form of the rotary drive shafts 11, 12, in each case for purposes of actuation of the at least one flap A1, A2 or B1, B2 per wing. The two rotary drive shafts 11, 12, are coupled to the central drive device P and are synchronised with one another by means of the latter. On the basis of appropriate control commands the central drive device P sets the rotary drive shafts 11, 12 in rotation, for purposes of exerting actuating movements of the adjustment devices A11, A12, B11, B12, A21, A22, B21, B22, coupled with the latter, of the respective adjustable flap A1, A2 or B1, B2. A load limiter or torque limiter L can be integrated in a shaft section of the rotary drive shafts 11, 12 located near the drive device P.

At least one adjustment device A11, A12, B11, B12, A21, A22, B21, B22 is coupled to each flap A1, A2 or B1, B2, for purposes of adjusting the same. In the high-lift system 1 represented in FIG. 1 two adjustment devices A11, A12 or B11, B12 or A21, A22 or B21, B22 are in each case arranged on each adjustable flap A1, A2, B1, B2, and more precisely on the inner adjustable flaps A1 and B1 the adjustment devices A11, A12 and B11, B12 respectively, and on the outer flaps A2 and B2 the adjustment devices A21, A22 and B21, B22 respectively. All adjustment devices, that is to say, in general, at least one adjustment device, which in total in each case actuate one flap, can also be called an adjustment station.

Figure 2:
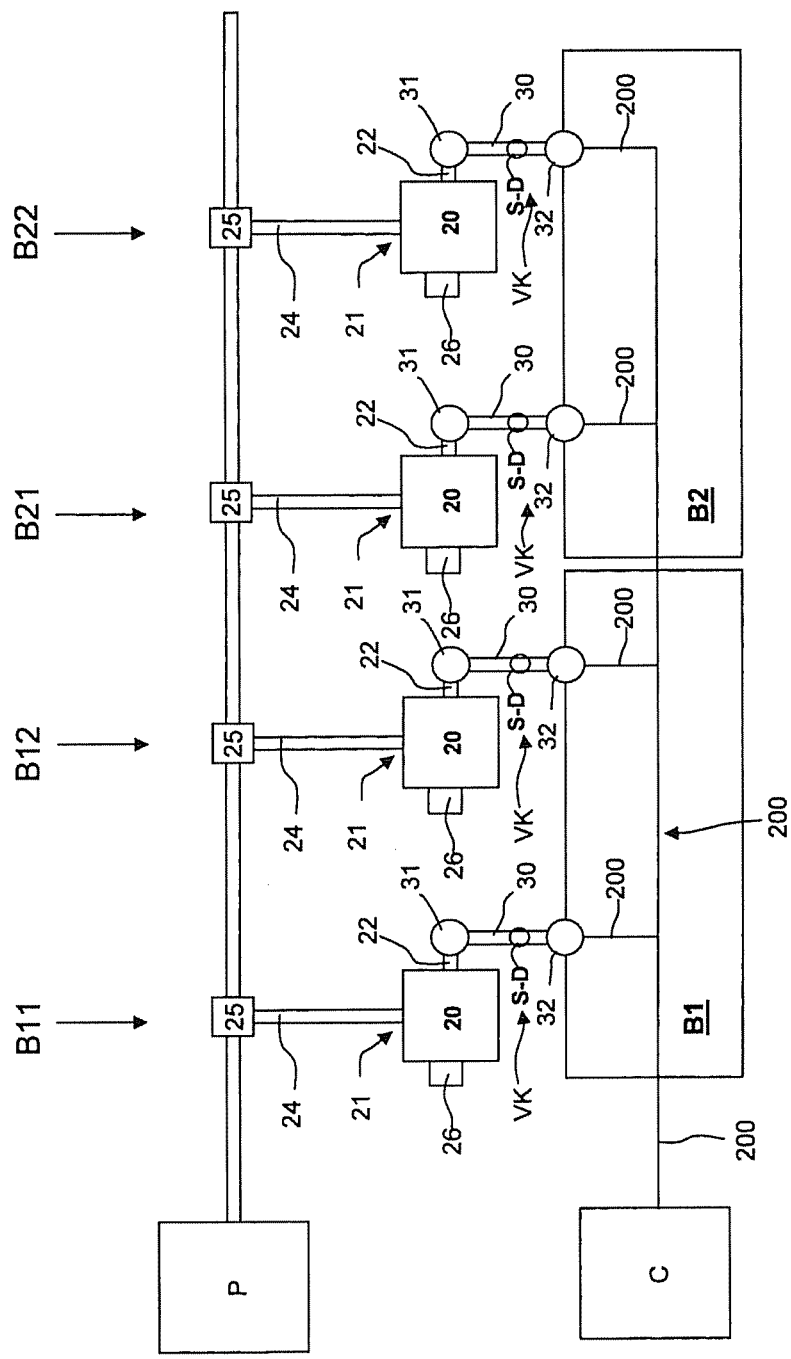
FIG. 2 shows an enlarged representation of the section of the high-lift system from FIG. 1 that is provided for the right-hand wing as viewed in the longitudinal axis of the aeroplane.

In what follows the adjustment devices B11, B12, B21, B22 and the adjustable flaps B1, B2 are described with the aid of FIG. 2, wherein the components of different adjustment devices B11, B12, 821, 822 of the same function in each adjustment device B11, B12, B21, B22 are provided with the same reference symbols. In the figure is represented a form of embodiment of the adjustment system, and in particular of the high-lift system 1, in which each adjustment device 811, B12, B21, B22 has a load sensor S-D on the drive rod 30, or integrated into the latter.

Each of the adjustment devices 811, B12, B21, 822 (in the representation of FIG. 1 each of the adjustment devices A11, A12, B11, 812, A21, A22, 821, 822) has an actuator 20 or a step-up gearbox 20, and a kinematic adjustment mechanism VK for purposes of kinematic coupling of the actuator 22 to the adjustable flap. In general the actuator 20 is coupled to the output of the drive device. This can be implemented by means of the step-up gearbox 25. In the form of embodiment represented in FIG. 1 such a step-up gearbox 25 is provided for purposes of converting the movement of the respective drive shaft 11, 12 into a movement of a drive component or drive element 21, which is coupled with the actuator 20, in order to transfer an input movement to an input element 21 or a so-called "down-drive link" on the input side of the actuator 20. The actuator or the step-up gearbox 20 is mechanically coupled to the respective rotary drive shafts 11, 12 and converts a rotational movement of the respective rotary drive shafts 11, 12 into an adjustment movement of the flap region, which is coupled with the respective adjustment devices B11, B12, B21, B22.

Here provision can be made that a position sensor 26 is arranged (FIG. 2) on each adjustment device 811, 812, 821, 822 of a flap, which sensor determines the current position of the respective adjustable flap A1, A2, B1, 82 and transmits this position value via a cable, not represented, to the control and monitoring device C.

The actuator 20 is in general coupled to the adjustable flap A1, A2, B1, B2 via a kinematic adjustment mechanism VK for purposes of kinematic coupling of the actuator 20.

Furthermore in general the actuator 20 has an output element, or drive element 22, which is coupled with a flap-side coupling device 30 for purposes of coupling the actuator 20 with the respective adjustable flap. In this manner a movement of the output element 22 is translated into a movement of the respective adjustable flap A1, A2, B1, B2. Here a mechanical translation mechanism with a step-up function can be provided between the input element 21 and the output element 22.

In addition an asymmetry sensor 28 can be arranged at the ends of the rotary drive shafts 11, 12 respectively; this is likewise functionally connected with the control and monitoring device C via a cable, not represented, and via this cable transmits a current value to the control and monitoring device C, which states whether the ends of the rotary drive shafts 11, 12 have rotated within a specified range, or whether an asymmetric rotational position of the rotary drive shafts 11, 12 is present.

Furthermore, a wing tip region brake WTB can be arranged on each rotary drive shaft 11, 12; when actuated this can lock up the rotary drive shaft or the respective drive train 11, 12. Here the one wing tip region brake WTB is in particular arranged at a point on the rotary drive shafts 11, 12 that is located in an outer region of the wing in question. Each of the wing tip region brakes WTB is functionally connected via a cable, likewise not represented, with the control and monitoring device C, and via this cable can be controlled and actuated by the control and monitoring device C. In operation the normal initial state of the wing tip region brake WTB is a non-actuated state in which it does not interfere with the rotation of the rotary drive shafts 11, 12. The wing tip region brakes WTB can be actuated with an appropriate control signal from the control and monitoring device C so as to arrest the respectively assigned rotary drive shaft 11, 12.

In an example of embodiment of an actuation device shown in FIG. 3 the actuator is embodied as a rotary actuator 120 and the output element as an actuator lever 122 and the drive rod 130, or connecting lever, which couples the actuator with the adjustable flap K via articulations 131, 132. Here a first articulation 131, with which the drive rod 130 is articulated on the actuator lever 122, and a second articulation 132, with which the drive rod 130 is articulated on the adjustable flap K, are provided.

In accordance with the invention a load sensor S-D is integrated in the drive rod 130 for purposes of recording the load occurring in the load path between the actuator and the adjustable flap of the respective adjustment device; this is functionally connected with the control and monitoring device C for purposes of receiving the sensor signals generated by the load sensor. The load sensor S-D is embodied as a sensor for purposes of measuring the longitudinal force occurring in a drive rod along its longitudinal direction L1. In accordance with one form of embodiment of the invention the drive rod is formed for this purpose from a first drive rod section 130a, articulated on the actuator lever 122, a second drive rod section 130b, articulated on the adjustable flap K, and a transverse pin 133 coupling these (FIG. 3). Here the drive rod sections 130a, 130b are arranged partially overlapping one another, so as to form an overlap region 130c. A seal 130d can be arranged in the overlap region and between the drive rod sections 130a, 130b, for purposes of preventing the penetration of dust and/or moisture into the region between the drive rod sections 130a, 130b. The transverse pin passes through the drive rod sections 130a, 130b, for purposes of producing a force-transferring coupling of the drive rod sections 130a, 130b in their overlap region 130c transverse to the longitudinal direction L1 of the drive rod 130. In accordance with the invention the load sensor S-D is a sensor arranged in or on the transverse pin 133 for purposes of determining the transverse forces acting on the pin, which result from the longitudinal forces occurring in the drive rod 130.

In accordance with the invention the load sensor can be formed from at least one strain gauge. Here the at least one strain gauge can be arranged on the transverse pin 133. The transverse pin can in particular be designed as a hollow pin. Here the at least one strain gauge can in particular be arranged on the inner surface of the transverse pin. The load sensor can be formed from a plurality of strain gauges in a full bridge arrangement. Furthermore provision can be made that the load sensor is embodied as a temperature-compensated sensor arrangement.

In accordance with one alternative form of embodiment of the invention the drive rod is formed from a first drive rod section 130a, articulated on the actuator lever 122, a second drive rod section 130b, articulated on the adjustable flap K, and a coupling device coupling these, which has a load sensor for purposes of determining longitudinal forces occurring in the drive rod 130. Here the coupling device can have, in particular, a pre-tensioning device and/or a damper device, with which the load sensor for purposes of determining longitudinal forces is integrated.

The adjustable flap is articulated by means of a bearing station LS with at least one bearing assembly 141 on the main wing surface H, wherein in the example of embodiment of FIG. 3 this is embodied as a bearing assembly 141 with a dropped-hinge kinematic mechanism. The bearing assembly 141 has an attachment strut 143 on the main wing surface H and extending downwards from the latter with reference to the wing thickness direction D-H, in which strut an articulating bearing 144 is provided. On the articulating bearing 144 is articulated a support device in the form of an articulated support 145, which is attached, or mounted in bearings, on a adjustable flap K by means of an attachment device 146. The actuator is embodied as a rotary actuator 120.

In an alternative design of the adjustment device as a kinematic track mechanism (not shown in the figures) an actuator, which can e.g. be a rotary actuator or a spindle drive, can be coupled to the slider, wherein a drive rod (analogous to the drive rod 130) is arranged via a first articulation on the slider and via a second articulation on the adjustable flap.

In general in accordance with the invention at least one adjustment device (in FIG. 1 the adjustment devices A11, A12, A21, A22, B11, B12, B21, B22) on a wing or on a adjustable flap A1, A2, B1, B2 has a load sensor S-D, which is arranged in the articulation 32 or 132, with which the drive rod 30 or 130 is coupled with the adjustable flap K or A1, A2; B1, B2, wherein the load sensor S-D is embodied such that this registers the forces occurring in this load path. The load sensor S-D is functionally connected with the control and monitoring device C for purposes of receiving the sensor signals generated by the load sensors. The load sensor S-D is provided for purposes of measuring loads, which as a result of external forces acting on the flap K are transferred onto the kinematic adjustment mechanism VK.

Here in particular provision can be made that the load sensor S-D measures the attainment or transgression of a nominally permitted maximum load for the respective adjustment device A11, A12, B11, B12, A21, A22, B21, B22 in which the measurement is undertaken. The measurement of the maximum load can be undertaken independently of a setting of the adjustable flap A1, A2, B1, B2 or K, that is to say, over the whole range of adjustment of the adjustable flap A1, A2, B1, B2 or K, if the specified maximum load is defined such that this in general represents a maximum permissible load. In the measurement of the maximum load provision can be made that this is undertaken continuously, or at specified time intervals, since the maximum load is defined independently of a setting of the adjustable flap A1, A2, B1, B2 or K. With the establishment of an assumed maximum load e.g. a fracture or a disconnect of one of the adjustment devices can be registered, since on the at least one further adjustment device of the same adjustable flap A1, A2, B1, B2 or K significantly higher loads then occur that are higher than the loads that occur when the adjustment devices are intact. In the case of a measurement, undertaken continuously or at intervals of time, of the load occurring in each case on the load sensor, the control and monitoring device C, which receives the sensor signals registered in each case, can compares these with a signal value corresponding to the specified maximum load and in the event of transgression of the maximum load can assign a fault state to the adjustment station of the flap, and can also, if necessary, command and introduce suitable measures for the reconfiguration of the adjustment system or the adjustment station. These measurements and the associated comparisons of the measured values with the maximum load can therefore be executed at each setting of the adjustable flap A1, A2, B1, B2 or K. In a similar manner by means of the comparison of the registered loads with a assumed maximum load a jam occurring in an adjustment device, and a skewing or tilting of the flap K in the adjustment station, can be determined. In this case higher loads occur on the respectively other adjustment device of the same flap than in the case when such a jammed state is non-existent, if an adjustment command has been commanded before and/or afterwards from the control and monitoring device C. In this case significantly higher forces are acting on the still intact adjustment device of the same adjustable flap A1, A2, B1, B2 or K in a second articulation 32 or 132, since in addition to the air loads, the forces exerted by the adjustment device are also acting on the second articulation 32 or 132, so that the control and monitoring device C on the basis of the signal values that for the respectively occurring load are registered by the load sensor S-D arranged in the same articulation, and on the basis of the execution of an appropriate comparison, determines a transgression of the specified maximum load. The control and monitoring device C can be embodied such that in this case it assigns a fault state to the respective adjustment station belonging to the adjustable flap A1, A2, 81, B2 or K concerned with the adjustment devices A11, A12 or 811, 812 or A21, A22 or B21, B22 respectively assigned to a adjustable flap A1, A2, B1, 82 or K, and also, if necessary, commands and introduces suitable measures for the reconfiguration of the adjustment system or the adjustment station.

If a load sensor S-D indicates a load-free state, while the other load sensor S-D, which is connected to the other drive station of the same adjustable flap A1, A2, B1, 82 or K indicates an increased load, a fracture of the actuator connection to the adjustable flap A1, A2, B1, B2 or K may be assumed and can be defined in terms of a corresponding fault state. Also in this case the control and monitoring device C can be embodied such that it generates a command signal to the braking devices, with which the adjustment system is immediately halted.

In the event of the locking up of an adjustment device of a adjustable flap A1, A2, B1, B2 or K, with a drive that continues to function onto a further adjustment device of the same flap an increased load arises on the defective adjustment device A11, A12, B11, B12, A21, A22, B21, B22 as a result of the then occurring skewing of the adjustable flap A1, A2, B1, B2 or K, which is detected on the basis of the appropriate comparison of the values determined from the there arranged load sensor S-D with design values, and by means of the control and monitoring device C as a result of the generation of an appropriate command signal also leads to the adjustment system being immediately rendered passive and halted.

As soon as a load sensor S-D detects a load that lies above a defined threshold value an overload is detected, and the respective control and monitoring device C can be embodied such that the adjustment system or the adjustment station is halted. The threshold value can be either a fixed specified value or a value that is dependent on other state parameters. If just one fixed value is used, the overload detection facility corresponds in function to today's load limiters, although operating on an electronic basis. The use of state-dependent threshold values enables earlier fault detection in many fault scenarios.

Alternatively or additionally provision can be made that with the load sensor S-D the lack of attainment and/or transgression of a operational load, specified on the basis of suppositions, is measured. Since the load sensors are located at the interface between system and structure provision can also be made in accordance with the invention that the structural loads are also determined with these sensors. If the load profiles are continuously recorded in the central computer these can be evaluated with respect to the structural load cycles. This information can be used for duty cycle monitoring and/or health monitoring.

The control and monitoring device C can be embodied such that this, on the basis of a comparison of signal values for the respectively occurring load with values for a supposed operational load, from a lack of attainment of a specified or determined operational load by the load actually established concludes and identifies a disconnect on the same adjustment device, since in this case the external forces occurring on the flap cannot be transferred via the connecting device onto the kinematic adjustment mechanism VK of the same adjustment device A11, A12, B11, B12, A21, A22, B21, B22. In this case the control and monitoring device C assigns a fault state to the respective adjustment device A11, A12, B11, B12, A21, A22, B21, B22 or adjustment station, and, if necessary, commands suitable measures for the reconfiguration of the adjustment system or the adjustment station, such as the halting of the adjustment system, or high-lift system 1, by means of the braking devices B1, B2.

Here provision can be made that the design value or comparison value used is a function of the adjustment position, wherein the respective comparison values or the specified operational load for each setting are determined by means of tests and stored in the control and monitoring device C. The measurements can thereby be continuously undertaken during operation of the aeroplane, i.e., in particular at e.g. regular intervals of time, and as a function of the adjustment state of the adjustment devices of a adjustable flap A1, A2, B1, B2 or K. Provision can also be made that load measurements are undertaken during the command and execution of an adjustment of the adjustment device A11, A12, B11, B12, A21, A22, B21, B22, i.e. of the adjustable flap A1, A2; B1, B2 or K.

In the provision of a continuous or regular load measurement the control and monitoring device C determines during the adjustment of the adjustable flap A1, A2, B1, B2 or K a comparison value, which—depending on the type of comparison value, that is to say, whether it takes the form of a maximum value or an operational load value—may not be transgressed, or the attainment of which may not fail, wherein depending on the respectively assumed setting of the adjustable flap A1, A2, B1, B2 or K a related comparison value is extracted for the comparison. If for example the landing flap is extended before the landing approach, the control and monitoring device C can at the same time undertake a measurement of the load by means of the load sensor and can determine via the comparison whether in these circumstances such a transgression of a maximum load or a lack of attainment of an operational load occurs and in the given case can assign a fault to the respectively concerned adjustment device. Thereupon or at the same time the control and monitoring device C can undertake a reconfiguration of the adjustment system and can thereby arrest the adjustment system 1 by means of the at least one braking device, and/or can specify a modified mode of operation for landing, which is suitable for the landing approach with the respectively determined fault case.

In particular a function can be implemented in the control and monitoring function C, with which the adjustment devices of a adjustable flap are traversed into a specified setting and then by means of which undertakes one of the load measurements in accordance with the invention on the adjustment devices of the adjustable flap, in order to determine, if necessary, a fault state on the same, and to introduce a reconfiguration of the adjustment system. The measurement can also be undertaken with the adjustable flap retracted.

In a high-lift system 1, in which the actuators 20 or 120 of the adjustment devices A11, A12, B11, B12, A21, A22, B21, B22 are commanded via a decentralised control and monitoring device C via electrical cables, and in which at least two actuators 20 or 120, are connected to a adjustable flap for purposes of actuation of the same, provision can be made that upon the assignment of a state of functional incapacity (fault case A) to the respective adjustment device A11, A12, B11, B12, A21, A22, B21, B22 by means of the adjustment device fault detection function the respective adjustable flap A11, A12, B11, B12, A21, A22, B21, B22 is no longer actuated. Here for purposes of avoiding control asymmetries provision can furthermore be made that the adjustable flap arranged symmetrically with reference to the aircraft longitudinal axis, relative to the adjustable flap affected by the fault case, is likewise no longer actuated. In addition provision can be made that a brake B1, B2 provided for this case in the actuator 20 or 120 for purposes of arresting the adjustable flap A11, A12, B11, B12, A21, A22, B21, B22 is actuated in its instantaneous adjustment state.

If the actuators are driven via a common rotary drive shaft 11, 12 and the respective components of the kinematic adjustment mechanism VK are fitted with a fail-safe mechanism, provision can be made by the high-lift system reconfiguration function for the adjustment devices A11, A12, B11, B12, A21, A22, B21, B22 concerned to continue to be actuated.

In such a high-lift system with commanding of actuators of the adjustment devices A11, A12, B11, B12, A21, A22, B21, B22 via a central control and monitoring function C via electrical cables, in the event of an assignment of fault case B the same optional measures can be introduced as in fault case A. In a high-lift system 1 in accordance with FIG. 1, in which the adjustment devices A11, A12, B11, B12, A21, A22, B21, B22 are mechanically driven via rotary drive shafts 11, 12, in the event of the assignment of fault case B to an adjustment device provision can be made that the system is locked via the motor brakes M1, M2 and/or the wing tip region brake WTB in order to avoid force conflicts internal to the system.

In the case of a centrally driven high-lift system 1, i.e. via rotary shafts 11, 12, in the event of a non-permissible deviation of the design positions determined by the control and monitoring device C from the actual positions registered by the position sensors 26, provision can be made that the control and monitoring device C or the high-lift system reconfiguration function transmits an actuation signal to the wing tip region brake WTB, and also to the at least one braking device B1, B2, for purposes of arresting both shaft trains 11, 12.

In the example of embodiment shown in FIG. 3 the actuator lever 131 of the rotary actuator 120 is coupled via the first articulation 131 to the drive rod 130, and this in turn is coupled via a second articulation 132 to a connecting device 135 of the adjustable flap K.

A kinematic adjustment mechanism VK of the adjustment devices A11, A12, B11, B12, A21, A22, B21, B22 of a adjustable flap A1, A2, B1, B2 or K in the embodiment as a dropped-hinge kinematic mechanism or as a kinematic track mechanism with a rotary actuator, 20, 120, can in particular be designed such that with execution of the maximum adjustment path of the flap the second articulation 32 or 132 between the drive rod 30 or 130 and the adjustable flap A1, A2; B1, B2 or K is adjusted through a range of angles which is 30% less, and preferably 50% less, than the range of angles through which the first articulation 31 or 131 is adjusted. That is to say that with a maximum adjustment path of the flap the angle between the drive rod 30 or 130 and the adjustable flap A1, A2, B1, B2 or K alters by an amount which is 30% less, and preferably 50% less, than the alteration of angle that occurs between the drive rod 30 or 130 and the actuator lever 22 or 122.

The load sensor S-D is provided for purposes of measuring loads, which as a result of external forces acting on the adjustable flap A1, A2, B1, B2 or K are transferred from the adjustable flap A1, A2, B1, B2 or K onto the kinematic adjustment mechanism VK. Here provision can be made that the attainment or transgression of a maximum load is measured with the load sensor S-D.

Alternatively or additionally provision can be made that the lack of attainment and/or transgression of a operational load is measured with the load sensor S-D. This occurs in particular in the event of a disconnect of a kinematic adjustment mechanism VK.

In accordance with one example of embodiment of the adjustment system, or high-lift system 1, the sensors are directly connected with a "central" control and monitoring device C, preferably arranged centrally in the aeroplane fuselage, wherein the signals from the load sensors S-D are transmitted to the central control and monitoring device C for purposes of evaluation, in which the comparison function is implemented for the comparison of the sensor signals registered by the load sensors S-D with design values, and also the evaluation with an assignment of a fault state to an adjustment device in the event of the presence of an appropriate deviation between the values that have been compared with one another (FIG. 1). Furthermore a reconfiguration function can be implemented in the central control and monitoring device C; which, on the basis of an assignment of a fault state to an adjustment device, generates commands for the reconfiguration of the adjustment system 1 or the flight guidance device of the aeroplane. Such a command can e.g. be a command to activate the braking devices B1, B2, WTB of the adjustment system and/or the commanding of a safety mode of operation or a back-up mode of operation in the flight guidance device of the aeroplane, e.g. a landing mode modified relative to the normal landing mode, in which the adjustable flaps A1, A2, B1, B2 or K that are considered to be still intact and controllable are traversed into a setting that is suitable for landing in a favourable manner with the determined fault state and/or a thereby determined setting of the adjustable flap A1, A2, B1, B2 or K, to which are coupled the adjustment devices A11, A12, B11, B12, A21, A22, B21, B22 of the high-lift system 1 that have been determined to be defective.

Figure 4:
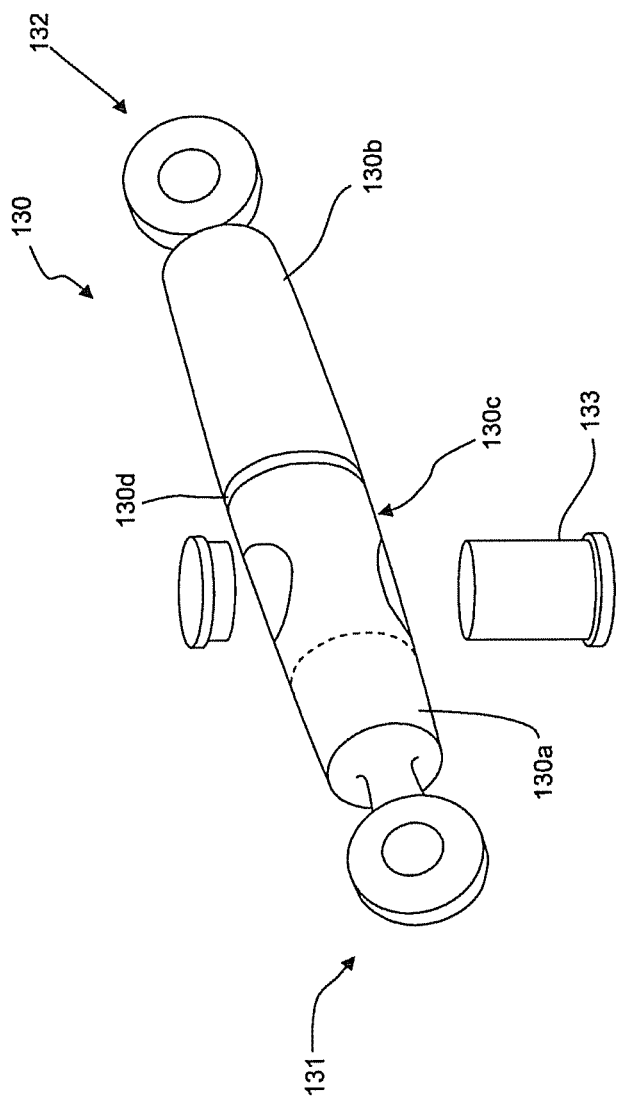
FIG. 4 shows an exploded schematic representation in perspective of one form of embodiment of the drive rod with a transverse pin, which has a load sensor in accordance with the invention.
Figure 5:
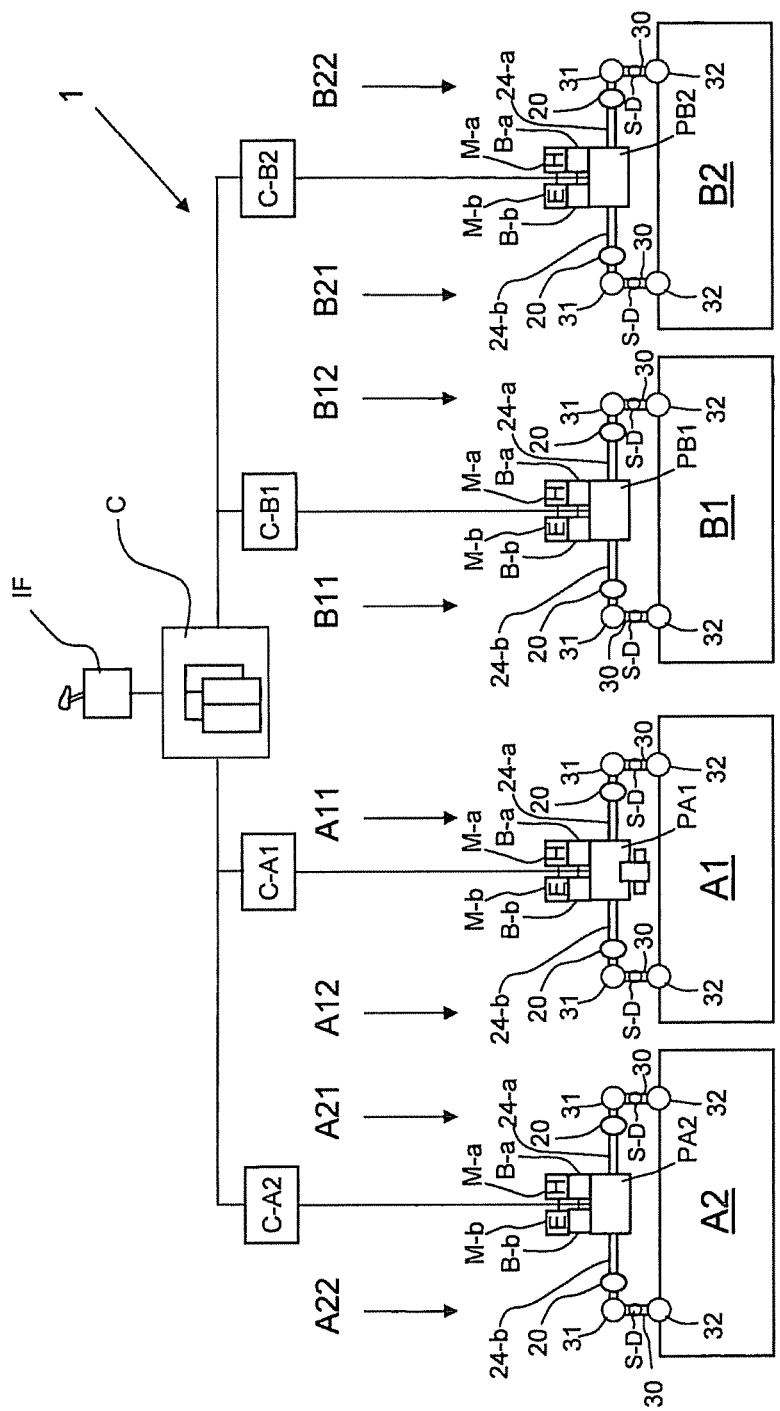
FIG. 5 shows a schematic representation of one form of embodiment of a high-lift system in accordance with the invention with adjustable flaps that is an alternative when compared with the representation of FIG. 1; its adjustment devices are actuated in each case via a drive device, wherein components of the high-lift system of FIG. 5 that have similar functions to those in FIG. 1 are in some cases assigned the same reference symbols.

In accordance with the example of embodiment represented in FIG. 4 decentralised or local control and monitoring devices C-A1, C-A2, C-B1, C-B2 can be provided, which are preferably assigned on the main wing surface and in the spanwise direction of the same to those respective adjustment devices A11, A12, B11, B12, A21, A22, B21, B22 of the same adjustable flap A1, A2, B1, B2 or K, and are preferably arranged locally in their spatial vicinity, which adjustment devices are in each case controlled by the local control and monitoring device C. Here provision can be made that each local control and monitoring device C-A1, C-A2, C-B1, C-B2 has a fault detection function and reconfiguration function in accordance with the invention with reference to the respectively assigned adjustment devices A11, A12, B11, B12, A21, A22, B21, B22. In an implementation of this kind a central control and monitoring device C is furthermore provided, which determines and commands design settings for each of the local control and monitoring devices C-A1, C-A2, C-B1, C-B2. The central control and monitoring device C receives from the local control and monitoring device C-A1, C-A2, C-B1, C-B2 the assignment of a fault state to an adjustment device or the adjustment devices A11, A12, B11, B12, A21, A22, B21, B22 of a adjustable flap A1, A2, B1, B2 or K, if on these a fault is respectively detected or a sensor value deviation has been determined.

In the form of embodiment in accordance with FIG. 4 a drive device PA1, PA2, PB1, PB2 is provided for each adjustable flap A1, A2, B1, B2; each drive device can have at least one motor and one braking device. In the form of embodiment represented each drive device PA1, PA2, PB1, PB2 has two motors M-a, M-b and one gearbox, which is coupled with the output sides of the first braking device M-a embodied as a hydraulic motor (reference symbol H), and of the second braking device M-b embodied as an electric motor M2 (reference symbol E), such that the power outputs provided in each case from the devices embodied as an hydraulic motor H and an electric motor E are summated and transferred to the rotary drive shafts 24-a, 24-b. The at least one braking device is functionally connected with the respectively assigned decentralised control and monitoring device C-A1, C-A2, C-B1, C-B2. The control and monitoring devices C-A1, C-A2, C-B1, C-B2 are embodied such that under predetermined conditions, and in particular upon the assignment of a critical fault state to one of the components of the adjustment system, these can actuate the at least one braking device B-a, B-b and thus can arrest the rotary shaft drives 24-a, 24-b. The drive devices PA1, PA2, PB1, PB2 are embodied such that the failure of one of the two drive motors, in the example of embodiment represented, e.g. the hydraulic motor H or the electric drive E, can be compensated with the effect that the output power of the gearbox is halved.

The integration of the load sensor S-D in the drive lever 130 enables a cable routing for the functional connection of the load sensor S-D with the respectively assigned control and monitoring device C, C-A1, C-A2, C-B1, C-B2 via the respective adjustable flap K, via at least one of the bearing assemblies 141 of this adjustable flap K, into the main wing surface to the respectively assigned control and monitoring device C, C-A1, C-A2, C-B1, C-B2. This form of embodiment of the cable routing can be implemented both in the case of a bearing assembly with a kinematic track mechanism, and also in the case of a bearing assembly with a dropped-hinge kinematic mechanism. In this manner a cable routing via the actuator is avoided and an implementation with relatively simple plug-in connections between cable sections is made possible.

This cable routing is schematically represented in FIG. 3 with the aid of a bearing assembly 141 in a dropped-hinge kinematic mechanism. The cable 200 runs from the load sensor S-D along the connecting device 135, and from there via an opening into the interior of the adjustable flap K. Alternatively the cable 200 can also be introduced from the articulation 132 into an internal cavity of a connecting device 135, and from there into the adjustable flap K. Within the adjustable flap K a collection point 210 can be provided, at which the cable 200 coming from the load sensor S-D can be joined together with one or a plurality of further cables, in particular for purposes of connecting sensors to the respective control and monitoring device, as is represented, for example, in FIG. 2. From there the cable 200 is guided via at least one articulated support 145, 145a, 145b to the articulated bearing 212, with which the articulated support is articulated on the attachment strut 143. Here the cable 200 can have a plug-in connection 211 on the structural attachment or coupling of the articulated support 145 or an articulation strut 145a, 145b of the same, for purposes of connecting two cable sections of the cable line 200, in order to be able to implement the adjustable flap K, such that it can be released from the articulated support and thus from its bearing assembly. The cable line 200 then runs past the articulation 144 along the attachment strut 143 into the interior of the main wing surface H. On the articulation 144 a plug-in connection of two cable sections can again be provided. The articulated supports 145, 145a, 145b and the attachment strut 143 can have hollow interiors with devices for cable routing, and the cable line 210 can run in the interiors of the articulated supports 145, 145a, 145b and in the interior of the attachment strut 143. The hollow interior can in particular be implemented in terms of an empty conduit, which is fitted to the outer face of the articulated supports 145, 145a, 145b and/or of the attachment strut 143, installed in the articulated supports 145, 145a, 145b and/or the attachment strut 143, or structurally integrated into the articulated supports 145, 145a, 145b and/or the attachment strut 143.

In the case of an adjustment system with local control and monitoring devices C-A1, C-A2, C-B1, C-B2, the cable line 202 is routed to these control and monitoring devices C-A1, C-A2, C-B1, C-B2, which are respectively assigned to the flap K concerned. In the case of an adjustment system with a central control and monitoring device C the cable line 200 is routed to the same control and monitoring device C.

The invention claimed is:

1. An adjustment system for a fault-tolerant aeroplane adjustable flap system, the adjustment system comprising:
   at least one adjustable flap, supported by an articulation device and adjustable on each wing of an aeroplane;
   at least one adjustment device for adjustment of the adjustable flap, wherein each of the adjustment device comprises: an actuator and a kinematic adjustment mechanism for kinematic coupling of the actuator to the adjustable flap with a drive rod, wherein the drive rod is coupled via a first articulation to the actuator and via a second articulation to the adjustable flap;
   at least one drive device for driving the adjustment device;

a load sensor for capturing a load occurring in a load path between the actuator and the adjustable flap of the respective adjustment device, the load sensor measuring longitudinal force occurring in the drive rod along a longitudinal direction; and a control and monitoring device functionally connected with the at least one drive device for adjustment of the adjustment device and functionally connected with the load sensor for receiving sensor signals generated by the load sensor;

wherein the drive rod is formed from a first drive rod section articulated on the actuator, a second drive rod section articulated on the adjustable flap, and a transverse pin coupling these, wherein the drive rod sections are arranged partially overlapping one another with a formation of an overlap region, and the transverse pin for producing a force-transferring coupling of the drive rod sections passes through the drive rod sections in their overlap region transverse to the longitudinal direction of the drive rod; and the load sensor is a sensor arranged on the transverse pin for determining transverse forces acting on the transverse pin, which result from forces occurring in the drive rod.

2. The adjustment system in accordance with claim 1, wherein the load sensor is formed from at least one strain gauge, which is fitted to the drive rod.

3. The adjustment system in accordance with claim 1, wherein the transverse pin is configured as a hollow pin forming at least partially an interior, and in that the load sensor is formed from at least one strain gauge, which is arranged in the interior of the transverse pin.

4. The adjustment system in accordance with claim 3, wherein the load sensor is formed from a plurality of strain gauges in a full bridge arrangement.

5. The adjustment system in accordance with claim 3, wherein the load sensor is embodied as a temperature-compensated sensor arrangement.

6. The adjustment system in accordance with claim 1, wherein, the load sensor is connected via a signal connecting cable with the control and monitoring device for transmitting the sensor signals generated by the load sensor, which cable leads from the load sensor into the adjustable flap, within the adjustable flap, together with a signal connecting cable coupled with a load sensor of at least one further adjustment device, is routed out of the adjustable flap via an opening device of the adjustable flap, so that the signal connecting cables from there can be routed into a main wing surface and to the control and monitoring device.

7. The adjustment system in accordance with claim 1, wherein the control and monitoring device has a fault detection function, which is embodied such that the fault detection function assigns a fault state to an adjustment device with a load sensor, if on a basis of sensor signals received from the load sensor a failure to attain a set point value indicating an operational load is determined.

8. The adjustment system in accordance with claim 7, wherein the set point value indicating the operational load is less than 60% of a value measured by the load sensor for a maximum permissible operational load, or a load determined as a maximum operational load.

9. The adjustment system in accordance with claim 7, wherein the set point value indicating the operational load is specified as a fixed value in the control and monitoring device.

10. The adjustment system in accordance with claim 7, wherein the control and monitoring device has a set point value determining function, with which the set point value indicating the operational load is determined under operational conditions by the control and monitoring device on a basis of operational parameters of the aeroplane.

11. The adjustment system in accordance with claim 10, wherein the set point value indicating the operational load is determined in the control and monitoring device as a function of the setting of the adjustable flap.

12. The adjustment system in accordance with claim 10, wherein the set point value indicating the operational load is a set point value determined from state parameters of the aeroplane.

* * * * *

UNITED STATES PATENT AND TRADEMARK OFFICE
CERTIFICATE OF CORRECTION

PATENT NO. : 9,108,724 B2  
APPLICATION NO. : 13/724319  
DATED : August 18, 2015  
INVENTOR(S) : Martin Recksiek, Wilfried Ellmers and Christoph Winkelmann Page 1 of 1

It is certified that error appears in the above-identified patent and that said Letters Patent is hereby corrected as shown below:

On title page, item 12
 replace "Rechsiek et al."
 with --Recksiek et al.--.

On title page, item 72 Inventors
 replace "Martin Rechsiek"
 with --Martin Recksiek--.

Signed and Sealed this
Fifth Day of January, 2016

Michelle K. Lee
*Director of the United States Patent and Trademark Office*